(12) United States Patent
Kiyota et al.

(10) Patent No.: US 11,508,499 B2
(45) Date of Patent: Nov. 22, 2022

(54) GROMMET WITH GROOVE PORTION BETWEEN PAIR OF CONTACT PORTIONS, AND WIRE HARNESS

(71) Applicant: Yazaki Corporation, Tokyo (JP)

(72) Inventors: Hirotaka Kiyota, Shizuoka (JP); Masaru Kiuchi, Shizuoka (JP); Takeshi Onoda, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 72 days.

(21) Appl. No.: 17/172,076

(22) Filed: Feb. 10, 2021

(65) Prior Publication Data

US 2021/0257131 A1 Aug. 19, 2021

(30) Foreign Application Priority Data

Feb. 18, 2020 (JP) .............................. JP2020-025019

(51) Int. Cl.
*H01B 17/30* (2006.01)
*H01B 17/58* (2006.01)
*H02G 3/22* (2006.01)
*B60R 16/02* (2006.01)

(52) U.S. Cl.
CPC ......... *H01B 17/301* (2013.01); *H01B 17/583* (2013.01); *H02G 3/22* (2013.01); *B60R 16/0222* (2013.01)

(58) Field of Classification Search
None
See application file for complete search history.

(56) References Cited

U.S. PATENT DOCUMENTS

| 4,797,513 A | * | 1/1989 | Ono | H02G 3/088 |
| | | | | 16/2.2 |
| 4,945,193 A | * | 7/1990 | Oikawa | H02G 3/0625 |
| | | | | 277/606 |
| 5,732,440 A | * | 3/1998 | Wright | H02G 15/013 |
| | | | | 16/2.2 |
| 5,739,475 A | * | 4/1998 | Fujisawa | B60R 16/0222 |
| | | | | 174/153 G |

(Continued)

FOREIGN PATENT DOCUMENTS

| CN | 1822461 A | * | 8/2006 | ......... B60R 16/0222 |
| CN | 102239617 A | | 11/2011 | |

(Continued)

*Primary Examiner* — Timothy J. Dole
*Assistant Examiner* — Muhammed Azam
(74) *Attorney, Agent, or Firm* — Kenealy Vaidya LLP

(57) ABSTRACT

A grommet includes: a water stop portion that has an annular shape and is inserted to a through hole formed in an attachment panel for stopping water; and a first partition wall portion and a second partition wall portion that are unit arranged to project toward a radially inner side of the water stop portion. The water stop portion includes: a first contact portion that is capable of coming into contact with a first side surface of a circumference edge portion of the through hole; a second contact portion that is capable of coming into contact with the first side surface; a groove portion formed in an annular shape between the first contact portion and the second contact portion; and a recess/protrusion portion that is formed on a circumferential wall inside the groove portion.

17 Claims, 5 Drawing Sheets

(56) References Cited

U.S. PATENT DOCUMENTS

| | | | | |
|---|---|---|---|---|
| 5,981,877 A * | 11/1999 | Sakata | ............... | B60R 16/0222 439/567 |
| 6,088,876 A * | 7/2000 | Daoud | ............... | F16L 5/10 16/2.2 |
| 6,297,457 B1 * | 10/2001 | Yamada | ............... | B60R 16/0222 174/152 G |
| 6,339,196 B1 * | 1/2002 | Uchida | ............... | H02G 3/22 174/153 G |
| 6,541,703 B2 * | 4/2003 | Nakata | ............... | F16L 5/10 174/152 G |
| 8,546,695 B2 * | 10/2013 | Okuhara | ............... | H02G 3/083 174/152 G |
| 8,584,315 B1 * | 11/2013 | Adachi | ............... | B60R 16/0222 174/152 G |
| 8,628,093 B2 * | 1/2014 | Suzuki | ............... | H02G 3/22 277/635 |
| 9,083,168 B2 * | 7/2015 | Kamenoue | ............... | B60R 16/0222 |
| 9,225,055 B2 * | 12/2015 | Kaneko | ............... | H01Q 1/42 |
| 9,365,171 B2 * | 6/2016 | Shitamichi | ............... | H02G 3/22 |
| 10,300,868 B2 * | 5/2019 | Ujita | ............... | H02G 3/22 |
| 10,424,906 B2 * | 9/2019 | Nakai | ............... | H01R 13/5219 |
| 2002/0036097 A1 * | 3/2002 | Okuhara | ............... | B60R 16/0222 174/152 G |
| 2002/0036098 A1 * | 3/2002 | Okuhara | ............... | B60R 16/0222 174/152 G |
| 2002/0138942 A1 * | 10/2002 | Sato | ............... | H02G 3/22 16/2.1 |
| 2003/0014924 A1 * | 1/2003 | Nakamura | ............... | B60R 13/0846 52/1 |
| 2004/0140118 A1 * | 7/2004 | Nishimoto | ............... | H02G 3/22 174/650 |
| 2006/0201710 A1 * | 9/2006 | Murakami | ............... | H02G 3/22 174/652 |
| 2008/0017401 A1 * | 1/2008 | Uchida | ............... | H02G 3/22 174/153 G |
| 2010/0115728 A1 * | 5/2010 | Kamenoue | ............... | B60R 16/0222 16/2.1 |
| 2010/0307794 A1 * | 12/2010 | Baydoun | ............... | H02G 3/22 174/152 G |
| 2011/0011625 A1 * | 1/2011 | Okuhara | ............... | H02G 3/22 174/152 G |
| 2014/0021688 A1 * | 1/2014 | Hattori | ............... | H02G 3/083 277/606 |
| 2015/0096801 A1 * | 4/2015 | Mori | ............... | H01R 13/6591 174/653 |
| 2016/0039368 A1 * | 2/2016 | Shitamichi | ............... | F16L 5/02 16/2.2 |
| 2017/0104322 A1 * | 4/2017 | Scheuer | ............... | H02G 3/22 |
| 2018/0126929 A1 * | 5/2018 | Miller | ............... | B60R 16/0222 |
| 2021/0257131 A1 * | 8/2021 | Kiyota | ............... | H02G 3/22 |

FOREIGN PATENT DOCUMENTS

| | | | | |
|---|---|---|---|---|
| EP | 1 424 245 A2 | 6/2004 | | |
| EP | 3868609 A1 * | 8/2021 | ......... | B60R 16/0222 |
| JP | H1-10920 U | 1/1989 | | |
| JP | H9-322361 A | 12/1997 | | |
| JP | H11-234862 A | 8/1999 | | |
| JP | 4026486 B2 * | 12/2007 | ......... | B60R 16/0222 |
| JP | 2008027692 A * | 2/2008 | ......... | B60R 16/0222 |
| JP | 2008307945 A * | 12/2008 | | |
| JP | 2009-16182 A | 1/2009 | | |
| JP | 5931465 B2 * | 6/2016 | ......... | B60R 16/0222 |
| KR | 20100134770 A * | 12/2010 | | |
| KR | 20200037958 A * | 4/2020 | | |

* cited by examiner

GROMMET WITH GROOVE PORTION BETWEEN PAIR OF CONTACT PORTIONS, AND WIRE HARNESS

CROSS-REFERENCE TO RELATED APPLICATION(S)

The present application claims priority to and incorporates by reference the entire contents of Japanese Patent Application No. 2020-025019 filed in Japan on Feb. 18, 2020.

BACKGROUND OF THE INVENTION

1. Field of the Invention

The present invention relates to a grommet and a wire harness.

2. Description of the Related Art

Japanese Patent Application Laid-open No. 9-322361 discloses an example of a conventional grommet mounted to a vehicle, while being attached to a through hole formed in a panel (partition wall) through which a wiring material (wire harness) is inserted. This grommet has a lip portion that is pressed against a surface of the panel, and a suction cup portion that is provided at an outer circumference position of the lip portion and is attached to the panel with a vacuum state achieved therein.

The grommet disclosed in Japanese Patent Application Laid-open No. 9-322361 described above has the suction cup portion attached on the panel, so as not to come off from the panel due to due to water pressure or rattling. However, for example, when the suction cup portion comes off due to excessive water pressure, the water pressure is received by the lip portion, resulting in a risk of failing to provide the water stop effect.

SUMMARY OF THE INVENTION

The present invention is made in view of the above circumstance, and an object of the present invention is to provide a grommet and a wire harness capable of improving water stop performance.

In order to achieve the above mentioned object, a grommet according to one aspect of the present invention includes a water stop portion that has an annular shape and is inserted to a through hole formed in an attachment panel for stopping water; and a closing portion that is arranged to project toward a radially inner side of the water stop portion to close the annular shape of the water stop portion, wherein the water stop portion includes: a first contact portion that is capable of coming into contact with a first side surface of a circumference edge portion of the through hole in an axial direction, and is formed in an annular shape; a second contact portion that is provide on a radially outer side of the first contact portion, is capable of coming into contact with the first side surface, and is formed in an annular shape; a groove portion formed in an annular shape between the first contact portion and the second contact portion; and a recess/protrusion portion that is formed on a circumferential wall inside the groove portion.

According to another aspect of the present invention, in the grommet, it is possible to configure that the recess/protrusion portion is formed by a recess portion extending toward the radially inner side inside the groove portion.

According to still another aspect of the present invention, in the grommet, it is possible to configure that the recess portion is formed along a groove bottom of the groove portion.

According to still another aspect of the present invention, in the grommet, it is possible to configure that the recess/protrusion portion is formed in an annular shape along the annular shape of the groove portion.

According to still another aspect of the present invention, in the grommet, it is possible to configure that the water stop portion further includes a third contact portion that is capable of coming into contact with a second side surface of the circumference edge portion of the through hole in the axial direction, is formed in an annular shape, and faces the first contact portion in the axial direction.

In order to achieve the above mentioned object, a wire harness according to still another aspect of the present invention includes a wiring material having conductivity; and a grommet provided to the wiring material, wherein the grommet includes: a water stop portion that has an annular shape and is inserted to a through hole formed in an attachment panel for stopping water; and a closing portion that is arranged to project toward a radially inner side of the water stop portion to close the annular shape of the water stop portion, and the water stop portion includes: a first contact portion that is capable of coming into contact with a first side surface of a circumference edge portion of the through hole in an axial direction, and is formed in an annular shape; a second contact portion that is provide on a radially outer side of the first contact portion, is capable of coming into contact with the first side surface, and is formed in an annular shape; a groove portion formed in an annular shape between the first contact portion and the second contact portion; and a recess/protrusion portion that is formed on a circumferential wall inside the groove portion.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments according to the present invention will be described in detail with reference to the drawings. Note that, the present invention is not limited to the embodiment. In addition, the components in the following embodiments include those that can be easily replaced by those skilled in the art, or those that are substantially the same.

Embodiment

Figure 1:
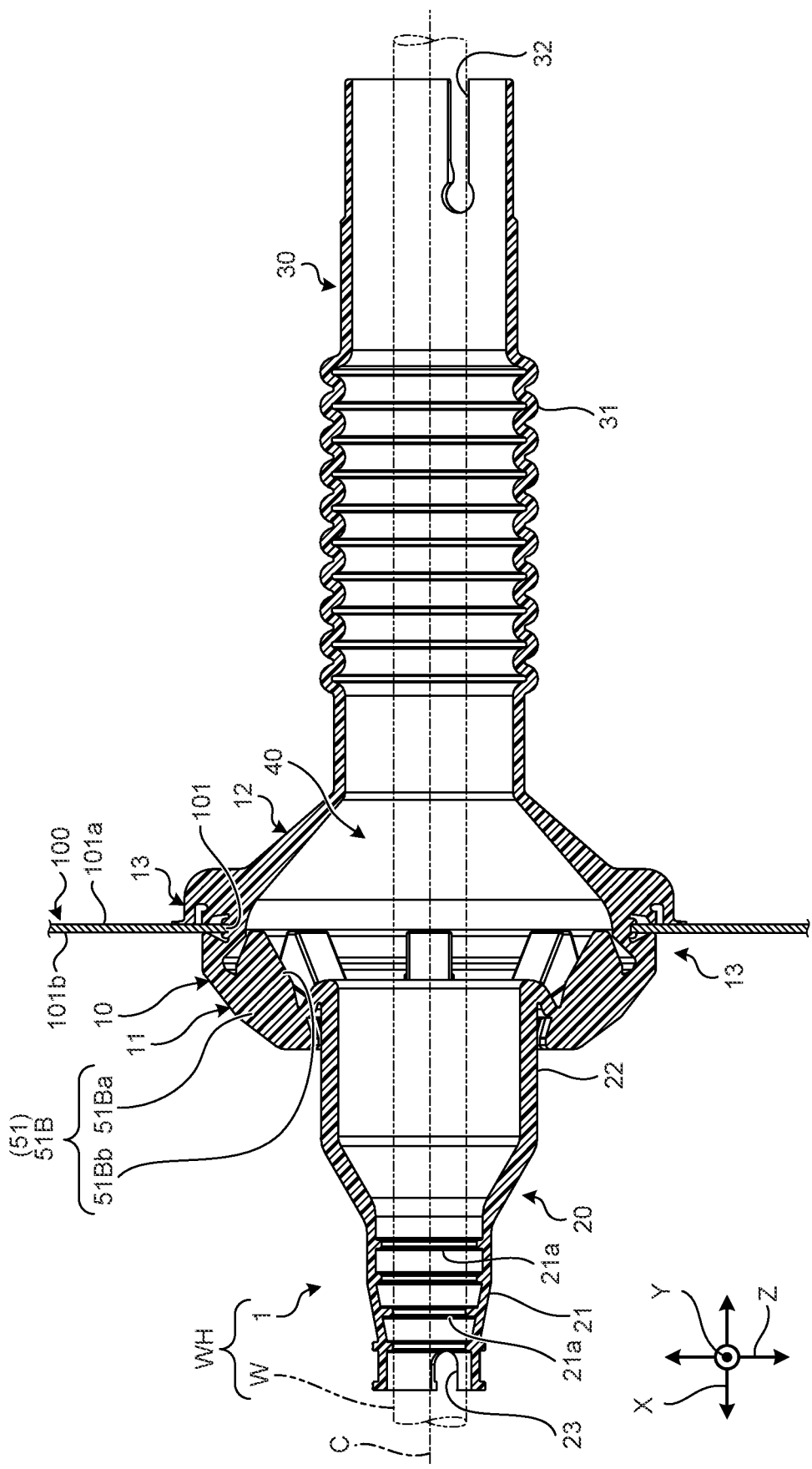
FIG. 1 is a cross-sectional view illustrating a schematic configuration of a wire harness to which a grommet according to an embodiment is applied.
Figure 2:
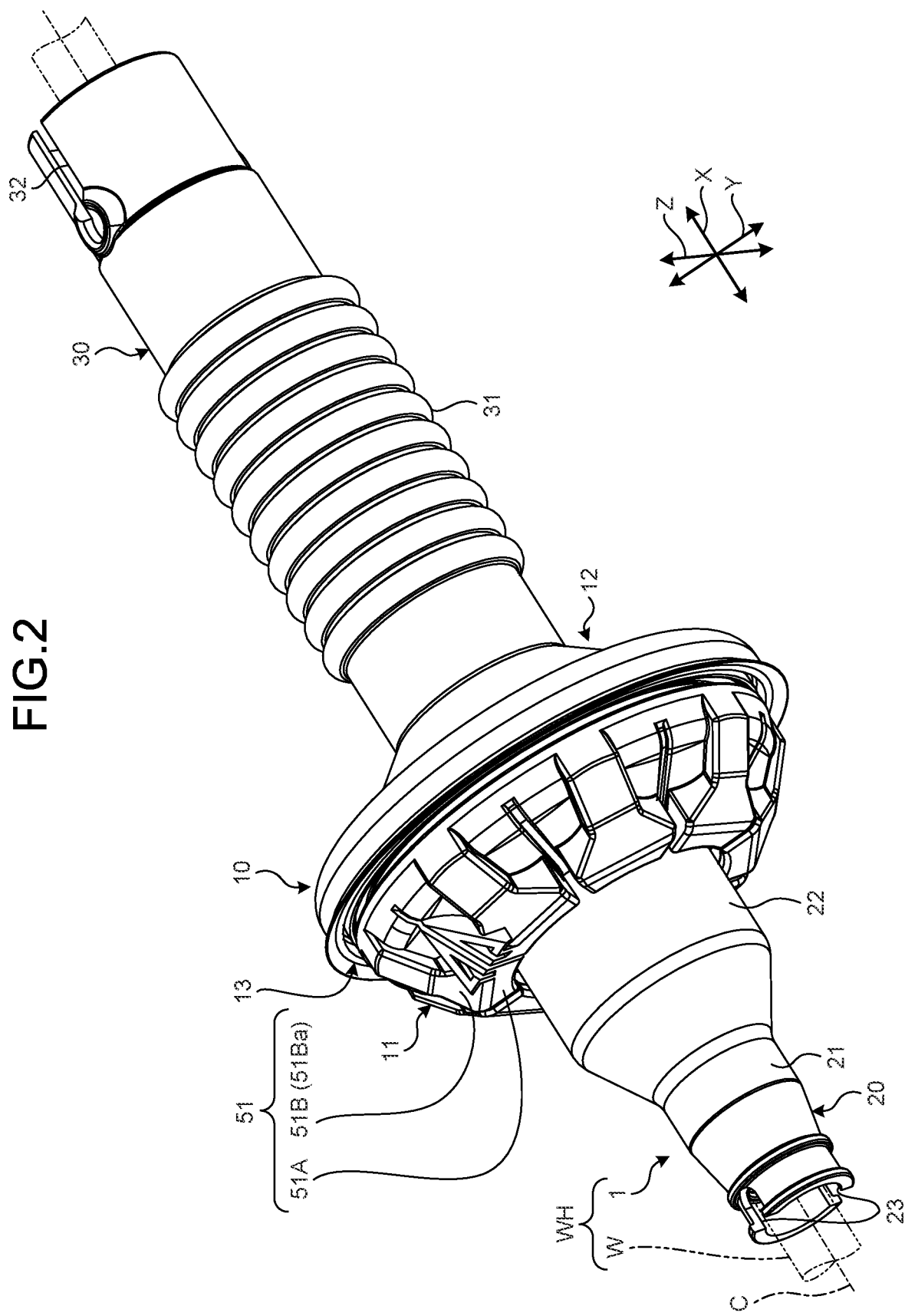
FIG. 2 is a perspective view illustrating a schematic configuration of the wire harness to which the grommet according to the embodiment is applied.

A grommet 1 of the present embodiment illustrated in FIGS. 1 and 2 is incorporated in a wire harness WH wired in a vehicle or the like. Here, the wire harness WH comprising, for example, a plurality of wiring materials W used for power supply and signal communication bundled to be an assembly part, and the plurality of wiring materials W are connected to devices installed in the vehicle so that the devices are connected to each other via a connector or the like. The wire harness WH includes the conductive wiring material W and the grommet 1 provided to the wiring material W. The wiring material W is inserted through the grommet 1. The wire harness WH may further include various components such as exterior members including corrugated tubes, resin tapes, and protectors, electrical junction boxes, and fixtures. The wiring material W is composed of, for example, a metal rod, an electric wire, an electric wire bundle, and the like. The metal rod is formed by covering the outside of a conductive rod-shaped member with an insulating coating portion. The electric wire is formed by covering the outside of a conductor portion (core wire) made of a plurality of conductive metal strands, with an insulating coating portion. The electric wire bundle is a bundle of the electric wires. The wire harness WH has a plurality of the wiring materials W bundled and aggregated, and is electrically connected with various devices via a connector or the like provided at the terminal of the bundled wiring materials W.

The grommet 1 is applied to a through hole 101 when the wiring material W is wired over two spaces, partitioned by an attachment panel 100 serving as a boundary, through the through hole 101 formed in the attachment panel 100 serving as an attachment target. The attachment panel 100 is, for example, a metal plate forming a body of a vehicle or the like, and the through hole 101 is formed along a plate thickness direction through the attachment panel 100. The two spaces partitioned by the attachment panel 100 serving as the boundary are typically a vehicle interior space (a cabin for example) and a vehicle exterior space (an engine compartment for example). The grommet 1 is assembled to the through hole 101 with the wiring material W of the wire harness WH inserted therethrough while being externally fit on the circumference of the wiring material W, to protect the wiring material W provided through the through hole 101 and stop entry of water (proof against water) through the through hole 101. The grommet 1 has functions such as dustproofing and sound insulation, in addition to the water stopping for the through hole 101. Hereinafter, the configuration of the grommet 1 will be described in detail with reference to the drawings.

It should be noted that, of FIGS. 1 and 2, FIG. 2 has the attachment panel 100 omitted. In the following description, a first direction, a second direction, and a third direction crossing each other are respectively referred to as "axial direction X", "width direction Y", and "height direction Z". The axial direction X, the width direction Y, and the height direction Z are typically orthogonal to each other. Here, the axial direction X corresponds to the plate thickness direction of the attachment panel 100 described above, and corresponds to the insertion direction of the wiring material W and the grommet 1 with respect to the through hole 101. In other words, the axial direction X is the direction along the extending direction of the wiring material W inserted through the grommet 1. The width direction Y and the height direction Z correspond to the extending direction of the attachment panel 100. Here, for the sake of easily understandable description, the wiring material W will be described as being linearly wired along the axial direction X. However, the present invention is not limited to this. The axial direction X in the state where the grommet 1 is attached to the attachment panel 100 may be a bent direction, with the grommet 1 and the wiring material W provided while being partially bent. Furthermore, each of the directions used in the following description will be described as a direction in a state where the grommet 1 is assembled to the attachment panel 100 unless otherwise noted. Furthermore, a center axis C passing through the center of the through hole 101 is orthogonal to the plate surface of the attachment panel 100 and extends along the axial direction X. A direction orthogonal to the center axis C is referred to as a radial direction, the side away from the center axis C is referred to as a radially outer side, and the side toward the center axis C is referred to as a radially inner side.

Specifically, the grommet 1 of the present embodiment into which the wiring material W is inserted along the axial direction X as illustrated in FIGS. 1 and 2 serves as a seal member that can stop water between the wiring material W and the through hole 101 of the attachment panel 100. The grommet 1 includes a main body portion 10, a tubular portion 20, and a tubular portion 30, and is formed as an elastic body with these components integrated. The grommet 1 is made of an insulating elastic resin material having low rigidity and high flexibility (for example, ethylene-propylene-diene rubber (EPDM)) such as rubber or thermoplastic elastomer, for example. The grommet 1 has internal space portions of the main body portion 10, the tubular portion 20, and the tubular portion 30 functioning as an insertion space portion 40. The insertion space portion 40 is a space portion through which the wiring material W is inserted, and is continuously provided along the axial direction X over the tubular portion 20, the main body portion 10, and the tubular portion 30. In the grommet 1, the wiring material W is inserted along the axial direction X into the insertion space portion 40 formed over the tubular portion 20, the main body portion 10, and the tubular portion 30 in a communicating manner.

The main body portion 10 is a portion that fits with the through hole 101 to stop water through the through hole 101, and is a portion into which the wiring material W is inserted along the axial direction X therewith. The main body portion 10 includes a first partition wall portion (closing portion) 11, a second partition wall portion (closing portion) 12, and a water stop portion 13.

The first partition wall portion 11 and the second partition wall portion 12 are spaced apart from each other along the axial direction X, are on a first side and a second side in the axial direction X while facing each other, and are integrated via the water stop portion 13. The water stop portion 13 is an annular outer circumferential portion provided to end portions of the first partition wall portion 11 and the second partition wall portion 12 located on the outer side in the radial direction (direction orthogonal to the center axis C). The first partition wall portion 11 and the second partition wall portion 12 are provided on the first side and the second side of the water stop portion 13 in the axial direction X, while projecting toward the radially inner side of the water stop portion 13 to close the annular shape of the water stop portion 13. The first partition wall portion 11 and the second partition wall portion 12 are formed in a hollow dome shape as a whole in a state of being integrated via the water stop portion 13. The tubular portion 20 is connected to a surface of the first partition wall portion 11 that is opposite to the side of the second partition wall portion 12 in the axial direction X. The tubular portion 30 is connected to a surface of the second partition wall portion 12 that is opposite to the side of the first partition wall portion 11 in the axial direction X.

The first partition wall portion 11 forms a protrusion portion 51 as illustrated in FIGS. 1 and 2. The protrusion portion 51 includes: an annular protrusion portion 51A formed in an annular shape around the center axis C so as to surround a base end portion 22 of the tubular portion 20; and a plurality of radiating protrusion portions 51B provided around the center axis C while extending from the annular protrusion portion 51A toward the radially outer side, to be positioned in a radiating manner. The annular protrusion portion 51A projects outward (toward the side opposite to the second partition wall portion 12 in the axial direction X) on the first partition wall portion 11. The radiating protrusion portions 51B each include an outer side radiating protrusion portion 51Ba and an inner side radiating protrusion portion 51Bb respectively protruding outward (toward the side opposite to the second partition wall portion 12 in the axial direction X) and inward (toward the insertion space portion 40, that is, toward the second partition wall portion 12 in the axial direction X) on the first partition wall portion 11. In the present embodiment, the radiating protrusion portions 51B are located at eight locations arranged at an equal interval in a circumferential direction. The grommet 1 of the present embodiment improves the strength of the first partition wall portion 11 by the protrusion portion 51, and suppresses deformation. For example, the grommet 1 of the present embodiment suppresses deformation of the main body portion 10 by the protrusion portion 51 in response to tilting of the wiring material W to extend along a direction crossing the axial direction X. In the grommet 1 of the present embodiment, the deformation of the first partition wall portion 11 in the radial direction is less likely to occur by the protrusion portion 51, meaning that the deformation is less likely to be transmitted to the water stop portion 13, whereby the water stop performance of the water stop portion 13 is maintained.

As illustrated in FIG. 1, the water stop portion 13 is formed between the first partition wall portion 11 and the second partition wall portion 12, to integrate these portions. The water stop portion 13 is located on the radially outer side of the first partition wall portion 11. Also, the water stop portion 13 is also located on the radially outer side of the second partition wall portion 12. The water stop portion 13 is a seal member that is inserted into the through hole 101 of the attachment panel 100, to stop water between the water stop portion 13 and the through hole 101. The water stop portion 13 is formed in an annular shape centered on the center axis C to conform with the annular shape of the through hole 101. In the present embodiment, the through hole 101 is formed in a circular shape, and the water stop portion 13 is also formed in a circular shape. The details of the water stop portion 13 will be described later.

As illustrated in FIGS. 1 and 2, the tubular portions 20 and 30 are integrally formed with the main body portion 10 to form a tubular shape, and the wiring material W is inserted therein along the axial direction X.

The tubular portion 20 is formed so as to protrude from the first partition wall portion 11 to the second side (toward the side opposite to the second partition wall portion 12) along the axial direction X. The tubular portion 20 is formed in a cylindrical shape centered on the center axis C, and extends along the axial direction X. The tubular portion 20 is formed in a cylindrical shape having a smaller diameter than the first partition wall portion 11. The tubular portion 20 has a distal end portion 21 on the second side in the axial direction X opened, and has the base end portion 22 on a first side connected to the first partition wall portion 11. The tubular portion 20 has the distal end portion 21 having a smaller diameter than the base end portion 22. The tubular portion 20 has a lip portion 21a formed on an inner circumferential surface of the distal end portion 21. The lip portion 21a is a pleated-like water stop portion formed in an annular shape along the circumferential direction, and a plurality of the lip portions 21a are provided at an interval along the axial direction X. Each lip portion 21a comes into contact with the outer surface of the wiring material W in a state of being inserted in the tubular portion 20, whereby water stop is achieved between the outer surface and the lip portion 21a.

Furthermore, the tubular portion 20 has notch portions 23 formed at the opening end of the distal end portion 21. The notch portions 23 are each a portion formed as a notch formed along the axial direction X from the opening end of the distal end portion 21 while having a predetermined width in the circumferential direction centered on the center axis C. The notch portions 23 are formed at two positions, of the distal end portion 21, symmetrical about the center axis C. The notch portions 23 function to elastically deform in a state where a winding tape or the like is wound around the distal end portion 21 of the tubular portion 20 in which the wiring material W is inserted, to bring the inner surface of the distal end portion 21 into close contact with the outer surface of the wiring material W, so that sealing can be achieved over the entire circumference of the wiring material W.

The tubular portion 30 is formed so as to protrude from the second partition wall portion 12 toward the first side (toward the side opposite to the first partition wall portion 11) along the axial direction X. The tubular portion 30 is formed in a cylindrical shape centered on the center axis C, and extends along the axial direction X. The tubular portion 30 is formed in a cylindrical shape having a smaller diameter than the second partition wall portion 12. The tubular portion 30 has a distal end on the first side in the axial direction X opened, and has a base end on the second side connected to the second partition wall portion 12. A bellows portion 31 is formed in an intermediate portion of the tubular portion 30 along the extending direction. The bellows portion 31 is formed with part of the tubular portion 30 in the axial direction X formed to be in a bellows shape. Specifically, the bellows portion 31 is formed with a part of the tubular portion 30 in the axial direction X shaped with a change in a direction of increasing the diameter and a change in a direction of reducing the diameter alternately occurring in the first direction of the axial direction X. With the bellows portion 31, the tubular portion 30 can be easily bent at the position of the bellows portion 31, in response to the bending of the wiring material W inserted.

Furthermore, the tubular portion 30 has notch portions 32 formed at the distal end. The notch portions 32 are each a portion formed as a notch formed along the axial direction X from the opening end of the distal end while having a predetermined width in the circumferential direction centered on the center axis C. The notch portions 32 are formed at two positions, of the tubular portion 30, symmetrical about the center axis C. The notch portions 32 function to elastically deform in a state where a winding tape or the like is wound around the distal end of the tubular portion 30 in which the wiring material W is inserted, to bring the inner surface of the tubular portion 30 into close contact with the outer surface of the wiring material W, so that sealing can be achieved over the entire circumference of the wiring material W.

Figure 3:
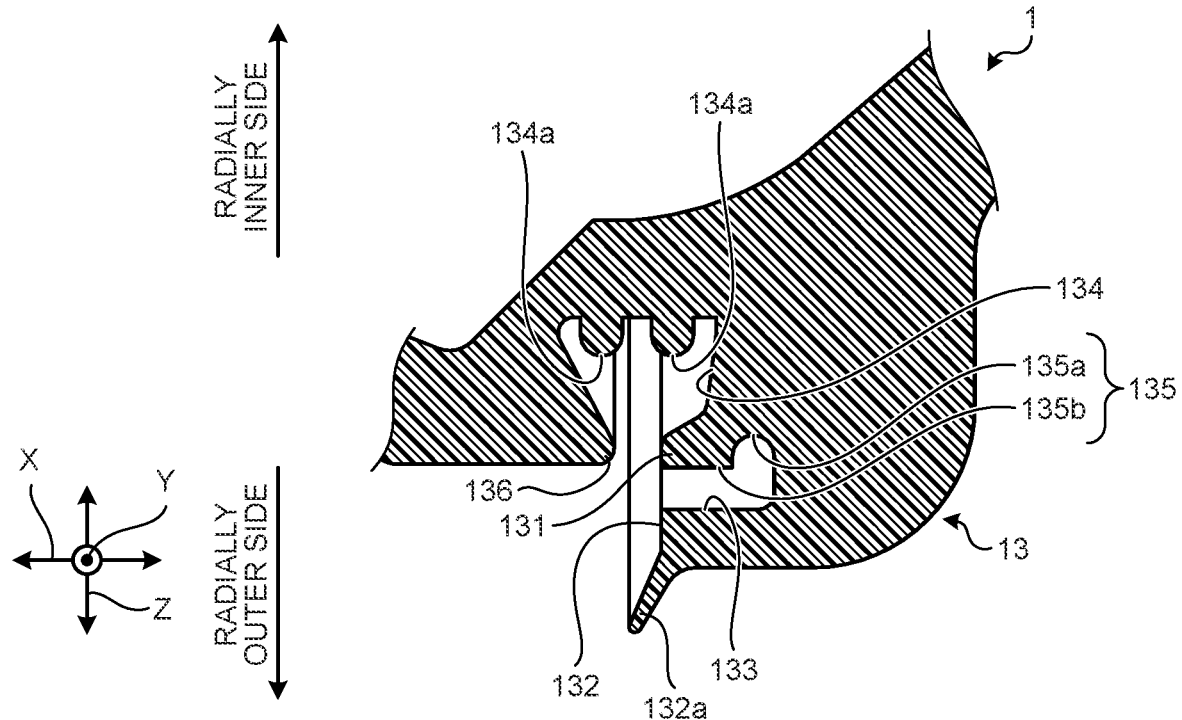
FIG. 3 is a partially enlarged cross-sectional view of the grommet according to the embodiment.
Figure 4:
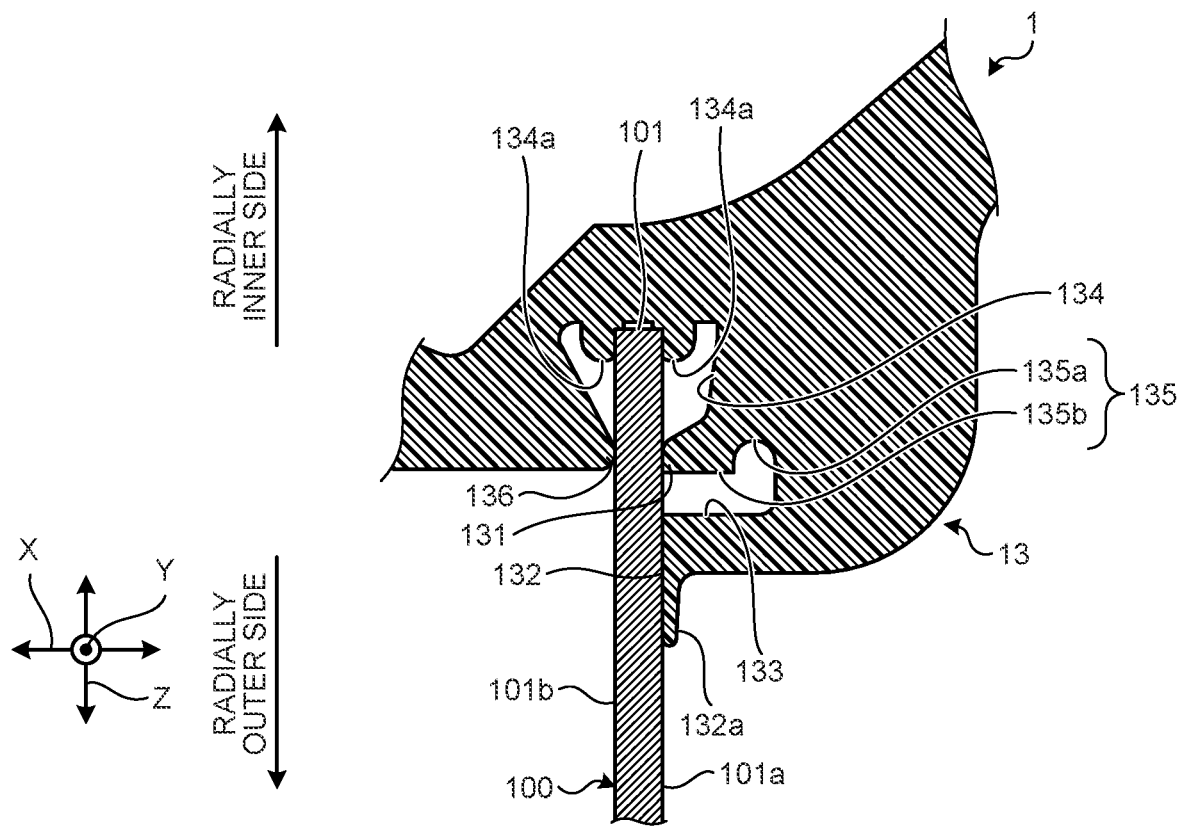
FIG. 4 is a partially enlarged cross-sectional view of the grommet according to the embodiment.

Now, the details of the water stop portion 13 will be described. As illustrated in FIGS. 3 and 4, the water stop portion 13 includes a first contact portion 131, a second contact portion 132, a groove portion 133, an insertion portion 134, a recess/protrusion portion 135, and a third contact portion 136. FIG. 3 illustrates a state before the water stop portion 13 is inserted into the through hole 101 of the attachment panel 100, and FIG. 4 illustrates a state in which the water stop portion 13 is inserted in the through hole 101 of the attachment panel 100.

The first contact portion 131 is provided to be capable of coming into contact with a first side surface 101a of a circumference edge portion of the through hole 101 in the state in which the water stop portion 13 is inserted to the through hole 101 of the attachment panel 100. The first side surface 101a of the circumference edge portion of the through hole 101 is, for example, a surface facing the vehicle exterior space side defined with the attachment panel 100 serving as a boundary. The first contact portion 131 is formed along the axial direction X to have the distal end facing the first side surface 101a of the circumference edge portion of the through hole 101, and is formed in an annular shape along the through hole 101.

The second contact portion 132 is provided to be capable of coming into contact with the first side surface 101a of a circumference edge portion of the through hole 101 in the state in which the water stop portion 13 is inserted to the through hole 101 of the attachment panel 100. On the radially outer side of the first contact portion 131, the second contact portion 132 is formed along the axial direction X to have the distal end facing the first side surface 101a of the circumference edge portion of the through hole 101, and is formed in an annular shape along the through hole 101. In addition, the second contact portion 132 includes a lip portion 132a. The lip portion 132a extends from the distal end of the second contact portion 132, which may be in contact with the first side surface 101a of the circumference edge portion of the through hole 101, toward the radially outer side and the side facing the first side surface 101a of the circumference edge portion of the through hole 101, that is, in the axial direction X, to have a tongue shaped cross section. As illustrated in FIG. 4, the lip portion 132a provides water stop property by being in contact with and extending along the first side surface 101a, in a state where the second contact portion 132 is in contact with the first side surface 101a of the circumference edge portion of the through hole 101.

The groove portion 133 is provided between the first contact portion 131 and the second contact portion 132, opens toward the first side surface 101a of the circumference edge portion of the through hole 101, extends in the axial direction X, and is formed in a bottomed shape. The groove portion 133 is formed in an annular shape along the through hole 101. With the groove portion 133 formed, the second contact portion 132 is formed so as to extend in the axial direction X to have the distal end facing the first side surface 101a.

The insertion portion 134 is a recess provided on the radially inner side of the first contact portion 131, and receives the circumference edge of the through hole 101. In other words, the circumferential end of the through hole 101 is inserted in the insertion portion 134. The insertion portion 134 is formed in an annular shape along the through hole 101. The insertion portion 134 has two protrusions 134a arranged in the axial direction X in a deep portion on the radially inner side. As illustrated in FIG. 4, in a state where the circumferential end of the through hole 101 is inserted in the insertion portion 134, the two protrusions 134a come into contact with and thus elastically deform to clamp the circumferential end of the through hole 101, and thus support the circumferential end of the through hole 101. With the insertion portion 134 and the groove portion 133 formed, the first contact portion 131 is formed so as to extend in the axial direction X to have the distal end facing the first side surface 101a.

The recess/protrusion portion 135 is formed inside the groove portion 133. The recess/protrusion portion 135 illustrated in FIGS. 3 and 4 is formed in a circumferential wall of the groove portion 133 on the radially inner side and on the side of the first contact portion 131. The recess/protrusion portion 135 is formed by a recess portion 135a extending toward the radially inner side inside the groove portion 133. Specifically, with the recess portion 135a formed in the circumferential wall of the groove portion 133 on the side of the first contact portion 131 to extend toward the radially inner side, a portion other than the recess portion 135a in the circumferential wall of the groove portion 133 on the side of the first contact portion 131 is formed as a protrusion portion 135b protruding toward the radially outer side, whereby the recess/protrusion portion 135 is formed. The recess portion 135a is formed so as to extend toward the radially inner side along a groove bottom of the groove portion 133. Furthermore, the recess/protrusion portion 135 is formed to be in an annular shape along the through hole 101, together with the groove portion 133. Note that the recess/protrusion portion 135 may be formed intermittently along the through hole 101.

The third contact portion 136 is provided to be capable of coming into contact with a second side surface 101b of a circumference edge portion of the through hole 101 in the state in which the water stop portion 13 is inserted to the through hole 101 of the attachment panel 100. The second side surface 101b of the circumference edge portion of the through hole 101 is, for example, a surface facing the vehicle interior space side defined with the attachment panel 100 serving as a boundary. The third contact portion 136 forms the insertion portion 134 with the distal end facing the second side surface 101b of the circumference edge portion of the through hole 101, to be formed along the axial direction X, and is formed in an annular shape along the through hole 101. The third contact portion 136 is provided to have a distal end facing the distal end of the first contact portion 131 in the axial direction X. Thus, the first contact portion 131 and the third contact portion 136 are provided to clamp the attachment panel 100 therebetween.

The grommet 1 configured as described above is mounted to the wiring material W with the wiring material W inserted through the insertion space portion 40 which is the internal space portions of the main body portion 10, the tubular portion 20, and the tubular portion 30, and then is inserted into the through hole 101 from the side of the tubular portion 30 together with the terminal end of the wiring material W. Then, the circumferential end of the through hole 101 is inserted into the insertion portion 134 of the water stop portion 13 of the main body portion 10, and the main body portion 10 fits with the through hole 101 with the two protrusions 134a of the insertion portion 134 pressed against and thus clamping the circumferential end of the through hole 101, whereby the grommet 1 is assembled to the attachment panel 100. In this state, the water stop portion 13 has the first contact portion 131 and the third contact portion 136 elastically deformed by coming into contact with the circumference edge portion of the through hole 101, to come into close contact with and clamp the circumference edge portion of the through hole 101 therebetween. Furthermore, the water stop portion 13 has the second contact portion 132 elastically deformed by coming into contact with the circumference edge portion of the through hole 101 coming into close contact with the first side surface 101a of the circumference edge portion of the through hole 101, and has the lip portion 132a of the second contact portion 132 extending along and coming into close contact with the first side surface 101a of the circumference edge portion of the through hole 101. The water stop portion 13 of the grommet 1 has the insertion portion 134 fitting with the circumferential end of the through hole 101, has the first contact portion 131 and the third contact portion 136 coming into close contact with and clamping the circumference edge portion off the through hole 101, and has the second contact portion 132 and the lip portion 132a coming into close contact with the first side surface 101a of the circumference edge portion of the through hole 101. With this configuration, the grommet 1 can seal the entire circumference edge portion of the through hole 101. Note that the grommet 1 may have the openings of the tubular portions 20 and 30 stopped water with a winding tape or the like wound around the wiring material W inserted through the insertion space portion 40, the tubular portions 20 and 30, and the wiring material W. Thus, with the grommet 1 and the wire harness WH, the main body portion 10 fits with the through hole 101 formed in the attachment panel 100 to stop water through the through hole 101, and has the wiring material W inserted therein.

Figure 5:
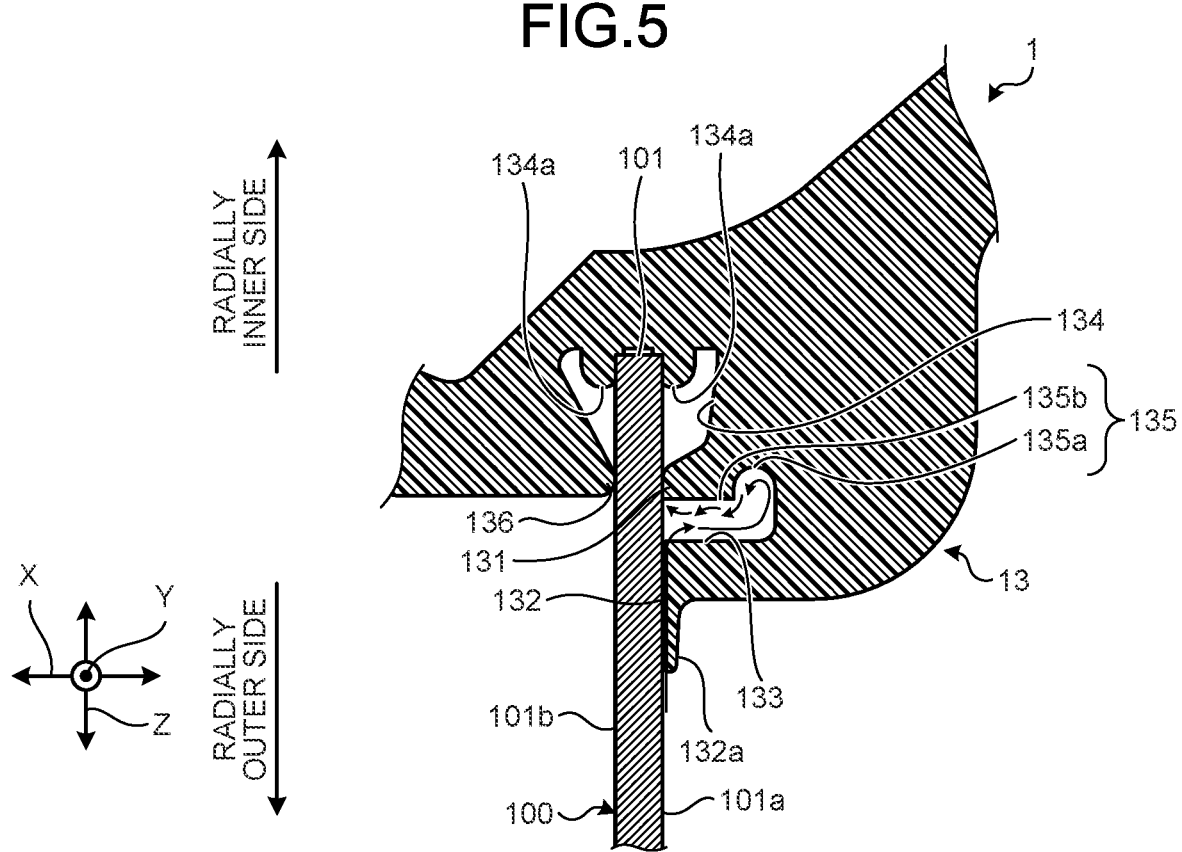
FIG. 5 is a partially enlarged cross-sectional view illustrating an effect of the grommet according to the embodiment.

Now a case is considered regarding the attachment panel 100 in the grommet 1 described above, where as illustrated in FIG. 5, water enters through close contact portions of the second contact portion 132 and the lip portion 132a, due to excessive water pressure applied to the first side surface 101a of the circumference edge portion of the through hole 101. The water that has entered through the close contact portions of the second contact portion 132 and the lip portion 132a enters the groove portion 133 due to the first contact portion 131 serving as weir. The water that has entered the groove portion 133 reaches the recess portion 135a forming the recess/protrusion portion 135, while having the flow changed to be in a direction from the radially outer side to the radially inner side at the groove bottom of the groove portion 133. Then, the water turns back at the end of the recess portion 135a whereby a turbulent flow is generated, involving various collisions resulting in a lower water pressure. In this way, when water flows over the second contact portion 132 and the lip portion 132a in the water stop portion 13 to enter, the water pressure of the grommet 1 is lowered by the recess/protrusion portion 135 inside the groove portion 133, whereby the water entered is prevented from flowing over the first contact portion 131.

As described above, the grommet 1 and the wire harness WH of the present embodiment include: the annular water stop portion 13 inserted in the through hole 101 formed in the attachment panel 100 to achieve water stop; and the closing portions (the first partition wall portion 11 and the second partition wall portion 12) arranged to project toward the radially inner side of the water stop portion 13 to close the annular shape of the water stop portion 13. The water stop portion 13 includes: the first contact portion 131 that is capable of coming into contact with the first side surface 101a of the circumference edge portion of the through hole 101 in the axial direction X and is formed in an annular shape; the second contact portion 132 that is provided on the radially outer side of the first contact portion 131, is capable of coming into contact with the first side surface 101a, and is formed in an annular shape; the groove portion 133 formed in an annular shape between the first contact portion 131 and the second contact portion 132; and the recess/protrusion portion 135 that is formed in the circumferential wall inside the groove portion 133.

Thus, with the grommet 1 and the wire harness WH, when water flows over the second contact portion 132 due to excessive water pressure to enter the groove portion 133 for example, the water pressure is reduced by the recess/protrusion portion 135 formed in the circumferential wall inside the groove portion 133, so that the water is prevented from flowing over the first contact portion 131. Thus, the grommet 1 and the wire harness WH can provide improved water stop performance.

Furthermore, according to the grommet 1 and the wire harness WH of the present embodiment, the recess/protrusion portion 135 is formed by the recess portion 135a extending toward the radially inner side inside the groove portion 133.

Thus, according to the grommet 1 and the wire harness WH, the flow of the water that has entered the groove portion 133 changes at the groove bottom of the groove portion 133 to be in a direction toward the radially inner side from the radially outer side, so that the water flows in such a manner to reach the recess portion 135a. Then, the water turns back at the end of the recess portion 135a whereby a turbulent flow is generated, involving various collisions resulting in a lower water pressure. Thus, the grommet 1 and the wire harness WH can provide improved water stop performance.

Furthermore, according to the grommet 1 and the wire harness WH of the present embodiment, the recess portion 135a is formed along the groove bottom of the groove portion 133.

Thus, according to the grommet 1 and the wire harness WH, the flow of the water that has entered the groove portion 133 changes at the groove bottom of the groove portion 133 to be in a direction toward the radially inner side from the radially outer side, and the water flows in such a manner to reach the recess portion 135a. Then, the water turns back at the end of the recess portion 135a whereby a turbulent flow is generated, involving various collisions resulting in a lower water pressure. Thus, the grommet 1 and the wire harness WH can provide improved water stop performance.

Furthermore, according to the grommet 1 and the wire harness WH of the present embodiment, the recess/protrusion portion 135 is formed in an annular shape along the annular shape of the groove portion 133.

Thus, according to the grommet 1 and the wire harness WH, the water pressure of the water that has entered the groove portion 133 is lowered over the entirety of the annular shape due to the recess/protrusion portion 135 formed along the annular shape of the groove portion 133. As a result, the grommet 1 and the wire harness WH can provide even more improved water stop performance.

Furthermore, according to the grommet 1 and the wire harness WH of the present embodiment, the water stop portion 13 further includes the third contact portion 136 that is capable of coming into contact with the second side surface 101b of the circumference edge portion of the through hole 101 in the axial direction X, formed in an annular shape, and faces the first contact portion 131 in the axial direction X.

Thus, according to the grommet 1 and the wire harness WH, the water stop portion 13 has the first contact portion 131 and the third contact portion 136 elastically deformed by coming into contact with the circumference edge portion of the through hole 101 coming into close contact with and clamp the first side surface 101a and the second side surface 101b of the circumference edge portion of the through hole 101 therebetween. Thus, the water that has entered by flowing over the second contact portion 132, is prevented from flowing over the first contact portion 131. As a result, the grommet 1 and the wire harness WH can provide even more improved water stop performance.

Figure 6:
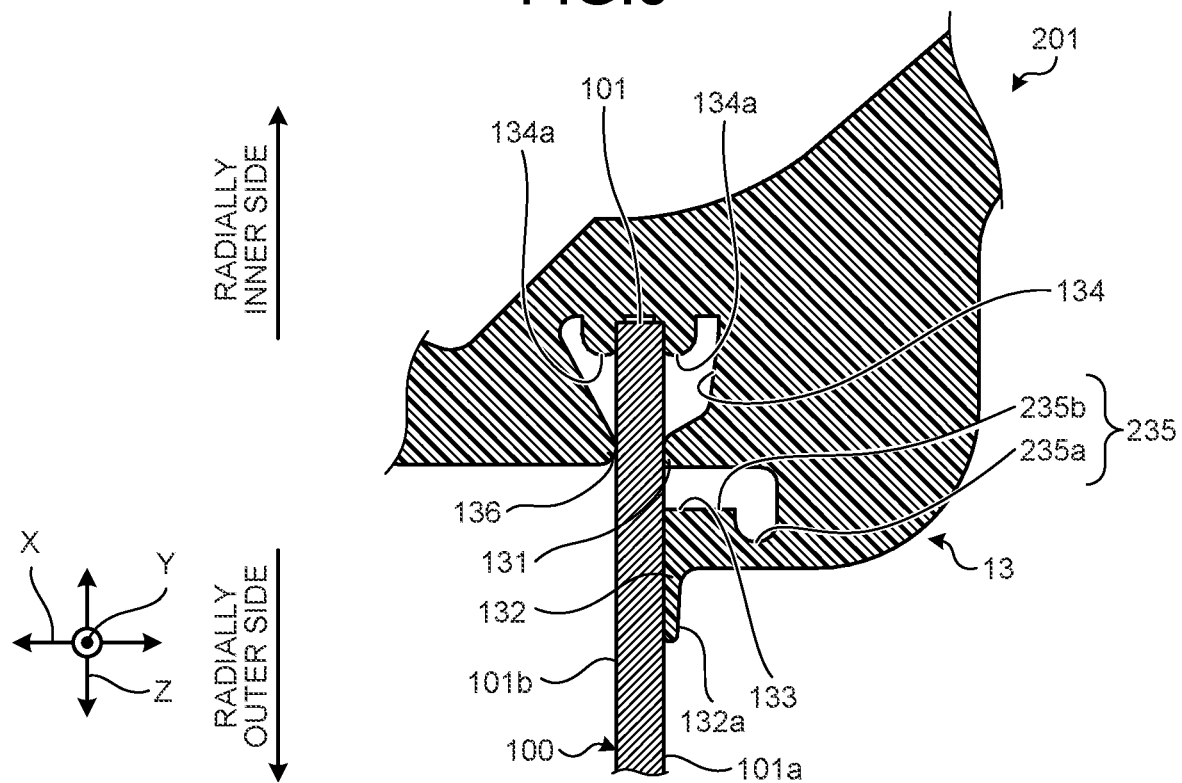
FIG. 6 is a partially enlarged cross-sectional view of a modification of the grommet according to the embodiment.

A grommet 201 according to a modification illustrated in FIG. 6 is different from the above-mentioned grommet 1 in that a recess/protrusion portion 235 is provided instead of the recess/protrusion portion 135. Other configurations of the grommet 201 according to the modification are substantially the same as those of the grommet 1 described above.

The recess/protrusion portion 235 according to the present modification is formed in a circumferential wall of the groove portion 133 on the radially outer side and on the side of the second contact portion 132. The recess/protrusion portion 235 is formed by a recess portion 235a extending toward the radially outer side inside the groove portion 133. Specifically, with the recess portion 235a formed in the circumferential wall of the groove portion 133 on the side of the second contact portion 132 to extend toward the radially outer side, a portion other than the recess portion 235a in the circumferential wall of the groove portion 133 on the side of the second contact portion 132 is formed as a protrusion portion 235b protruding toward the radially inner side, whereby the recess/protrusion portion 235 is formed. The recess portion 235a is formed so as to extend toward the radially outer side along a groove bottom of the groove portion 133. Furthermore, the recess/protrusion portion 235 is formed to be in an annular shape along the through hole 101, together with the groove portion 133. Note that the recess/protrusion portion 235 may be formed intermittently along the through hole 101. In addition, the recess/protrusion portion 235 may have the recess portion 235a formed to extend toward the radially outer side at an intermediate portion of the groove portion 133.

Also with the grommet 201 configured as described above, as with the grommet 1, when the water flows over the second contact portion 132 to enter the groove portion 133 due to excessive water pressure, the water pressure drops due to the recess/protrusion portion 235 formed in the circumferential wall inside the groove portion 133, whereby the water is prevented from flowing over the first contact portion 131. As a result, the grommet 201 and the wire harness WH can provide improved water stop performance. With the grommet 201, the water that has entered the groove portion 133 turns back to the opening of the groove portion 133 with the flow changed to be in a direction from the radially outer side to the radially inner side at the groove bottom of the groove portion 133. This process involves temporarily convection of the water that has entered the recess portion 235a, due to the increase in volume achieved by the recess portion 235a forming the recess/protrusion portion 235. The convection of the water in the recess portion 235a results in a drop in the water pressure.

Figure 7:
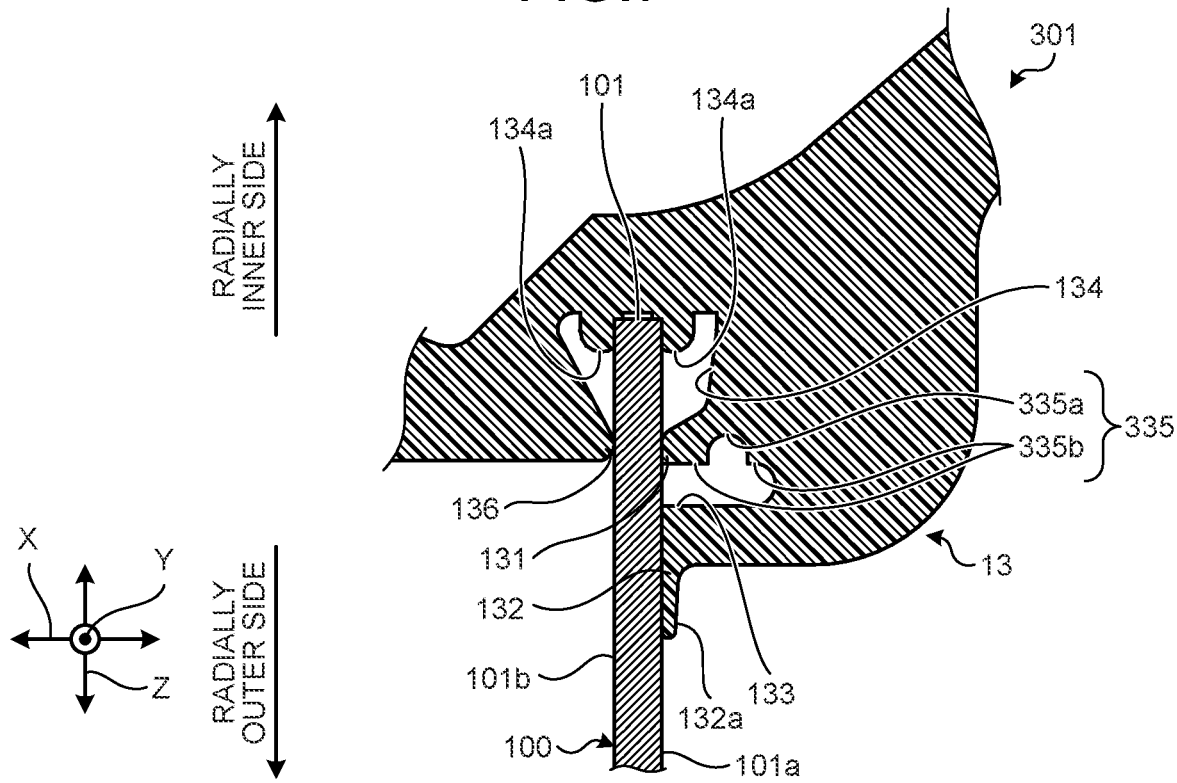
FIG. 7 is a partially enlarged cross-sectional view of a modification of the grommet according to the embodiment.

A grommet 301 according to a modification illustrated in FIG. 7 is different from the above-mentioned grommet 1 in that a recess/protrusion portion 335 is provided instead of the recess/protrusion portion 135. Other configurations of the grommet 301 according to the modification are substantially the same as those of the grommet 1 described above.

The recess/protrusion portion 335 according to the present modification is formed in a circumferential wall of the groove portion 133 on the radially inner side and on the side of the first contact portion 131. The recess/protrusion portion 335 is formed by a recess portion 335a extending toward the radially inner side inside the groove portion 133. Specifically, with the recess portion 335a formed in the circumferential wall of the groove portion 133 on the side of the first contact portion 131 to extend toward the radially inner side, a portion other than the recess portion 335a in the circumferential wall of the groove portion 133 on the side of the first contact portion 131 is formed as a protrusion portion 335b protruding toward the radially outer side, whereby the recess/protrusion portion 335 is formed. The recess portion 335a is formed so as to extend toward the radially inner side at an intermediate portion of the groove portion 133. Furthermore, the recess/protrusion portion 335 is formed to be in an annular shape along the through hole 101, together with the groove portion 133. Note that the recess/protrusion portion 335 may be formed intermittently along the through hole 101.

Also with the grommet 301 configured as described above, as with the grommet 1, when the water flows over the second contact portion 132 to enter the groove portion 133 due to excessive water pressure, the water pressure drops due to the recess/protrusion portion 335 formed in the circumferential wall inside the groove portion 133, whereby the water is prevented from flowing over the first contact portion 131. As a result, the grommet 301 and the wire harness WH can provide improved water stop performance. With the grommet 301, the water that has entered the groove portion 133 reaches the recess portion 335a forming the recess/protrusion portion 335, while having the flow changed to be in a direction from the radially outer side to the radially inner side at the groove bottom of the groove portion 133. Then, the water turns back at the end of the recess portion 335a whereby a turbulent flow is generated, involving various collisions resulting in a lower water pressure.

Figure 8:
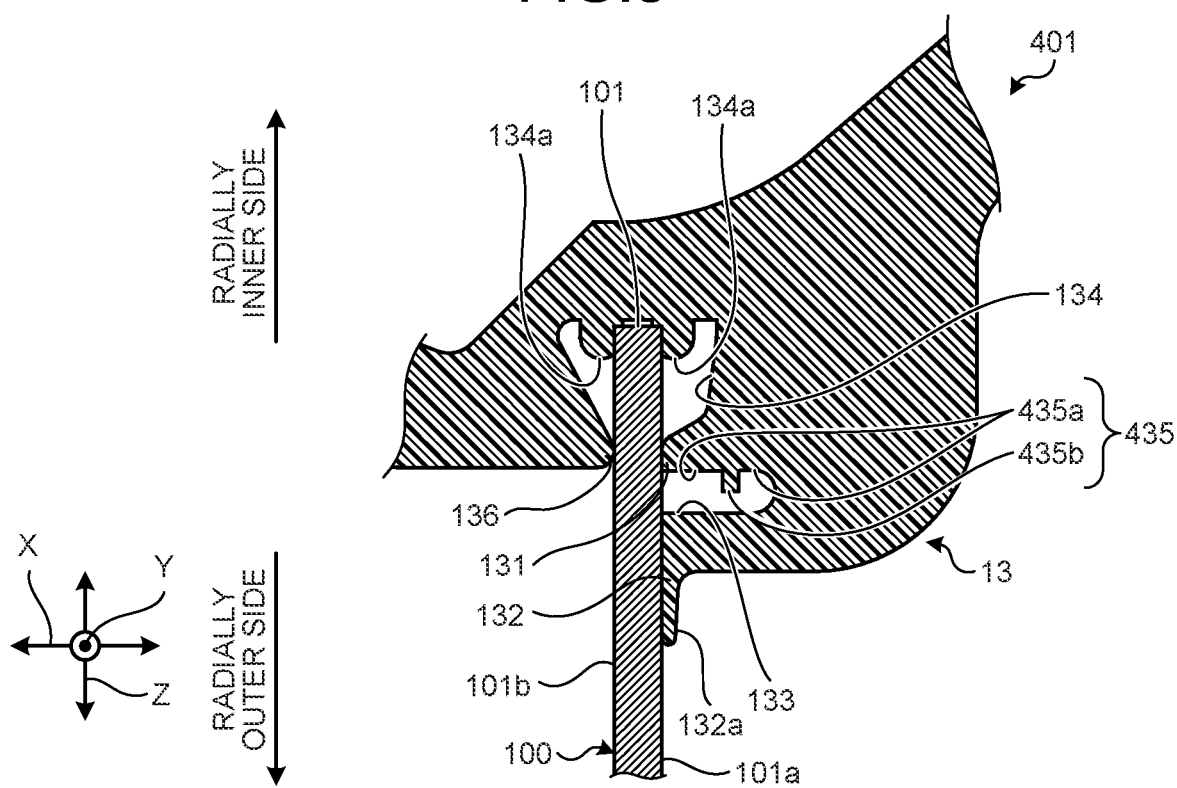
FIG. 8 is a partially enlarged cross-sectional view of a modification of the grommet according to the embodiment.

A grommet 401 according to a modification illustrated in FIG. 8 is different from the above-mentioned grommet 1 in that a recess/protrusion portion 435 is provided instead of the recess/protrusion portion 135. Other configurations of the grommet 401 according to the modification are substantially the same as those of the grommet 1 described above.

The recess/protrusion portion 435 according to the present modification is formed in a circumferential wall of the groove portion 133 on the radially inner side and on the side of the first contact portion 131. The recess/protrusion portion 435 is formed by a protrusion portion 435b protruding toward the radially outer side inside the groove portion 133. Specifically, with the protrusion portion 435b formed in the circumferential wall of the groove portion 133 on the side of the first contact portion 131 to extend toward the radially outer side, a portion other than the protrusion portion 435b in the circumferential wall of the groove portion 133 on the side of the first contact portion 131 is formed as a recess portion 435a recessed toward the radially inner side, whereby the recess/protrusion portion 435 is formed. The protrusion portion 435b is formed so as to extend toward the radially outer side at an intermediate portion of the groove portion 133. Furthermore, the recess/protrusion portion 435 is formed to be in an annular shape along the through hole 101, together with the groove portion 133. Note that the recess/protrusion portion 435 may be formed intermittently along the through hole 101.

Also with the grommet 401 configured as described above, as with the grommet 1, when the water flows over the second contact portion 132 to enter the groove portion 133 due to excessive water pressure, the water pressure drops due to the recess/protrusion portion 435 formed in the circumferential wall inside the groove portion 133, whereby the water is prevented from flowing over the first contact portion 131. As a result, the grommet 401 and the wire harness WH can provide improved water stop performance. With the grommet 401, the water that has entered the groove portion 133 reaches the recess portion 435a and the protrusion portion 435b forming the recess/protrusion portion 435, while having the flow changed to be in a direction from the radially outer side to the radially inner side at the groove bottom of the groove portion 133. Then, a turbulent flow is generated with the water turning back at the end of the recess portion 435a or with the flow interrupted by the protrusion portion 435b, involving various collisions resulting in a lower water pressure.

Note that the grommet 1, 201, 301, 401 and the wire harness WH according to the above-described embodiments of the present invention are not limited to the above-mentioned embodiments, and various modifications can be made without departing from the scope of the claims. Furthermore, the grommet 1, 201, 301, 401 and the wire harness WH according to the present embodiment may be formed by appropriately combining the components of the embodiments and modifications described above.

With the grommet and the wire harness according to the present embodiment, when water flows over the second contact portion due to excessive water pressure to enter the groove portion for example, the water pressure is reduced by the recess/protrusion portion formed in the circumferential wall inside the groove portion, so that the water is prevented from flowing over the first contact portion. Thus, the grommet and the wire harness can provide improved water stop performance.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A grommet comprising:
a water stop portion that has an annular shape and is inserted to a through hole formed in an attachment panel for stopping water; and
a closing portion that is arranged to project toward a radially inner side of the water stop portion to close the annular shape of the water stop portion, wherein
the water stop portion includes:
a first contact portion that is capable of coming into contact with a first side surface of a circumference edge portion of the through hole in an axial direction, and is formed in an annular shape;
a second contact portion that is provide on a radially outer side of the first contact portion, is capable of coming into contact with the first side surface of the circumferential edge portion, and is formed in an annular shape;
a groove portion formed in an annular shape between the first contact portion and the second contact portion;
a recess/protrusion portion that is formed on a circumferential wall inside the groove portion; and
an insertion portion that is capable of clamping a circumferential end of the through hole, the insertion portion is spaced away from the first contact portion in a radially inward direction of the water stop portion.

2. The grommet according to claim 1, wherein
the recess/protrusion portion is formed by a recess portion extending toward the radially inner side of the water stop portion inside the groove portion.

3. The grommet according to claim 2, wherein
the recess portion is formed along a groove bottom of the groove portion.

4. The grommet according to claim 1, wherein
the recess/protrusion portion is formed in an annular shape along the annular shape of the groove portion.

5. The grommet according to claim 2, wherein
the recess/protrusion portion is formed in an annular shape along the annular shape of the groove portion.

6. The grommet according to claim 3, wherein
the recess/protrusion portion is formed in an annular shape along the annular shape of the groove portion.

7. The grommet according to of claim 1, wherein
the water stop portion further includes a third contact portion that is capable of coming into contact with a second side surface of the circumference edge portion of the through hole in the axial direction, is formed in an annular shape, and faces the first contact portion in the axial direction.

8. The grommet according to of claim 2, wherein
the water stop portion further includes a third contact portion that is capable of coming into contact with a second side surface of the circumference edge portion of the through hole in the axial direction, is formed in an annular shape, and faces the first contact portion in the axial direction.

9. The grommet according to claim 3, wherein
the water stop portion further includes a third contact portion that is capable of coming into contact with a second side surface of the circumference edge portion of the through hole in the axial direction, is formed in an annular shape, and faces the first contact portion in the axial direction.

10. The grommet according to of claim 4, wherein
the water stop portion further includes a third contact portion that is capable of coming into contact with a second side surface of the circumference edge portion of the through hole in the axial direction, is formed in an annular shape, and faces the first contact portion in the axial direction.

11. The grommet according to of claim 5, wherein
the water stop portion further includes a third contact portion that is capable of coming into contact with a second side surface of the circumference edge portion of the through hole in the axial direction, is formed in an annular shape, and faces the first contact portion in the axial direction.

12. The grommet according to of claim 6, wherein
the water stop portion further includes a third contact portion that is capable of coming into contact with a second side surface of the circumference edge portion of the through hole in the axial direction, is formed in an annular shape, and faces the first contact portion in the axial direction.

13. A wire harness comprising:
a wiring material having conductivity; and
a grommet provided to the wiring material, wherein
the grommet includes:
a water stop portion that has an annular shape and is inserted to a through hole formed in an attachment panel for stopping water; and
a closing portion that is arranged to project toward a radially inner side of the water stop portion to close the annular shape of the water stop portion, and
the water stop portion includes:
a first contact portion that is capable of coming into contact with a first side surface of a circumference edge portion of the through hole in an axial direction, and is formed in an annular shape;
a second contact portion that is provide on a radially outer side of the first contact portion, is capable of coming into contact with the first side surface of the circumferential edge portion, and is formed in an annular shape;
a groove portion formed in an annular shape between the first contact portion and the second contact portion; and
a recess/protrusion portion that is formed on a circumferential wall inside the groove portion; and
an insertion portion that is capable of clamping a circumferential end of the through hole, the insertion portion is spaced away from the first contact portion in a radially inward direction of the water stop portion.

14. The grommet according to claim 1, wherein
the insertion portion includes a pair of protrusions configured to come into contact with the circumferential end of the through hole.

15. The grommet according to claim 1, wherein
the insertion portion includes an insertion recess and a pair of protrusions that are spaced away from the first contact portion by the recess, and
the protrusions are spaced away from each other by the insertion recess.

16. The grommet according to claim 7, wherein
the insertion portion includes an insertion recess and a pair of protrusions that are spaced away from the first contact portion and the third contact portion by the recess, and
the protrusions are spaced away from each other by a portion of the insertion recess.

17. The grommet according to claim 1, wherein
the second contact portion includes a lip portion extending from a distal end of the second contact portion.

* * * * *